Patented May 25, 1954

2,679,533

UNITED STATES PATENT OFFICE 2,679,533

ADDITION PRODUCTS OF HALOGEN AND QUATERNARY AMMONIUM GERMICIDES AND METHOD FOR MAKING THE SAME

John L. Darragh, Alamo, and Ralph House, San Pablo, Calif., assignors to California Research Corporation, San Francisco, Calif., a corporation of Delaware No Drawing. Application November 3, 1951, Serial No. 254,815

5 Claims. (Cl. 260—567.6)

This invention relates to novel addition products of quaternary ammonium germicides and halogen elements. More particularly, the invention is concerned with addition products of halogens and quaternary ammonium germicides having at least one high molecular weight organic substituent on the quaternary nitrogen atom. The addition products are characterized by an unusually high germicidal activity exceeding that of either the halogen or the quaternary.

The halogens, such as iodine, chlorine and bromine, have been used heretofore as germicides. However, they have invariably been subject to many serious disadvantages which the prior art has been unable to avoid. Iodine, for example, in solutions such as tincture of iodine, is a common medicinal germicide. It, unfortunately, is very irritating and is injurious to tissues of the human body when used in concentrations high enough to be thoroughly effective. Another, perhaps less serious but still significant, disadvantage of iodine lies in its tendency to cause discoloration and staining of surfaces with which it comes into contact. Chlorine and bromine also have been employed as disinfectants, but are highly corrosive to equipment as well as irritating to human tissue when used on it in germicidal concentrations.

Various halogen-containing compounds have been devised as disinfectants, but none has been entirely satisfactory. They are ordinarily of two general types—those that liberate free halogen under the conditions of use, and those that hold the halogen in chemically-combined form under all conditions. The former are limited to the germicidal power of the halogen alone, while the latter fail to utilize the fullest extent of the disinfecting properties of the halogen.

Quaternary ammonium germicides are also known to the art. Although they are generally considered to be very efficient germicides, their performance under certain conditions has necessitated use of uneconomically large proportions of the quaternary to be completely effective.

It has now been found that new and unusually effective addition products of halogen elements and quaternary ammonium germicides may be prepared which contain an appreciable quantity of physically bound elemental halogen as determinable by thiosulfate titration, yet which are substantially free of unbound elemental halogen as indicated, for example, by their failure to form halogen amines when contacted with ammonia vapors. The term "addition product" is deliberately employed for want of a more definitive term in view of the anomalous behavior of the addition products in various tests for elemental halogen.

The addition products of this invention may be prepared by adding a halogen, such as iodine, in elemental form or in the form of an aqueous or alcoholic solution of triodide, to an aqueous solution of a quaternary ammonium germicide. Upon mixing, the halogen is taken up by the quaternary ammonium compound and held in a loosely bound elemental form whereby it is immobilized in a physical sense of the word. The halogen may be added in any amounts up to the point where the quaternary ammonium compound is incapable of taking up additional halogen as indicated by the presence of appreciable halogen partial pressure, odor, or the formation of halogen amines when the addition product mixture is tested with ammonia vapors. The halogen taken up by the quaternary ammonia germicide, although physically bound, is available as elemental halogen, as is demonstrated by its being quantitatively determinable by titration with a thiosulfate.

The above halogen and quaternary ammonium germicide addition products are extremely effective germicides. They are not irritating or injurious to human tissue as the halogens ordinarily are, nor do the iodine addition products cause undue discoloration or staining of surfaces. The products are germicidally effective at very low concentrations.

The halogen portion of the addition products, according to this invention, may be either iodine, bromine, or chlorine, or mixtures thereof. Iodine is preferred as the halogen component. Mixtures of iodine with chlorine or bromine are also desirably employed as the halogen component. Quaternary-halogen addition products containing approximately equivalent amounts of iodine and chlorine are preferred examples of the mixed halogen products. The halogen may be added in various forms, as, for example, chlorine gas, liquid bromine, solid iodine, aqueous or alcoholic solutions of iodine, potassium tri-iodide, etc. Since chlorine and bromine each oxidizes iodide to iodine with concurrent formation of chloride and bromide respectively, quaternary-iodine, quaternary-iodine monobromide, and quaternary-iodine monochloride complexes can also be prepared by addition of appropriate amounts of bromine or chlorine to the appropriate quaternary ammonium iodide. The preferred form of iodine for preparation of the complex is the element.

A wide variety of quaternary ammonium germicides which are generally known to the art may be used in the addition products according to this invention. Such compounds will be obvious to those skilled in the art from the disclosure which follows. Illustrative of the preferred quaternary compounds are those characterized by the formula

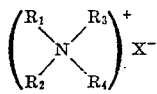

wherein at least one of the radicals $R_1$, $R_2$, $R_3$ and $R_4$ attached to the nitrogen atom is a hydrophobic aliphatic or araliphatic radical of from 6 to 26 carbon atoms. The hydrophobic aliphatic or araliphatic radicals may be long-chain alkyl, long-chain alkoxyaryl, long-chain alkylaryl, halogen substituted long-chain alkylaryl, long-chain alkylphenoxyalkyl, arylalkyl, etc. in nature. The remaining radicals on the nitrogen atom other than the hydrophobic aliphatic or araliphatic radicals are substituents of hydrocarbon structure containing a total of no more than 12 carbon atoms. The radical X in the above formula may be any salt-forming anionic radical. The suitable quaternary compounds are characterized by a high molecular weight above about 200.

Examples of quaternary ammonium compounds within the above description include the alkyl ammonium halides such as cetyl trimethyl ammonium bromide, octadecyl dimethyl ethyl ammonium bromide, dioctadecyl dimethyl ammonium chloride, etc. Other related quaternary ammonium salts are the alkylaryl ammonium halides such as long-chain alkyl dimethyl benzyl ammonium chlorides in general, including octadecyl dimethyl benzyl ammonium bromide; alkyl dimethyl dichlorbenzyl ammonium chloride, lauryl dimethyl benzyl ammonium chloride, and the like. N-alkylpyridinium halides as illustrated by N-cetylpyridinium bromide, N-laurylpyridinium chloride, myristyl γ picolinium chloride, etc., are suitable. Another type of quaternary ammonium salt which is contemplated is that wherein the molecule contains an ether linkage, as exemplified by compounds such as paratertiary octylphenoxyethoxyethyl dimethyl benzyl ammonium chloride, and the like. The quaternary ammonium salts having oxygen in the form of amide or ester linkages such as N-(laurylcolaminoformylmethyl)-pyridinium chloride, N-(myristylcolaminoformylmethyl)-pyridinium chloride, and the like, are also contemplated. Still other satisfactory types of quaternary ammonium compounds are those containing a sulfonamide group such as 2-phenyl-3-p-sulfamido-phenyl-5-undecyltetrazolium chloride, 4-sulfanilamido-benzyl tetradecyl dimethyl ammonium bromide, 4-dodecylsulfanilamidopyridinium bromide, etc. Another type of very effective quaternary ammonium germicide is that characterized by a substituted aromatic nucleus as in the case of lauryloxyphenyl trimethyl ammonium chloride, cetylaminophenyl trimethyl ammonium methosulfate, dodecylphenyl trimethyl ammonium methosulfate, dodecylbenzyl trimethyl ammonium chloride, chlorinated dodecylbenzyl trimethyl ammonium chloride, lauryl dimethyl chlorobenzyl ammonium chloride, cetyl dimethyl nitrobenzyl ammonium chloride, and the like. Yet another type of satisfactory quaternary ammonium compound is that represented by the morpholinium quaternaries such as the N-dodecyl-N-methyl morpholinium methosulfates and halides.

Although any of the above types of quaternary ammonium germicides are ordinarily satisfactory in the quaternary ammonium germicide and halogen addition products according to this invention, certain of the quaternary ammonium compounds such as the long-chain alkyl dimethyl benzyl quaternary ammonium salts, the alkylphenoxyalkoxyalkyl dimethyl benzyl quaternary ammonium salts, the N-(acylcolaminoformylmethyl)-pyridinium halides, the long-chain alkyl trimethyl ammonium halides, the long-chain alkylbenzyl trimethyl ammonium chlorides and the long-chain alkylbenzyl dimethyl benzyl ammonium chlorides in which the alkyl radical contains from 8 to 18 carbon atoms, are particularly satisfactory. Such compounds are not only highly effective in forming the desired addition products, but are readily available in good quantities. Of these more satisfactory quaternaries, those compounds of the long-chain alkylbenzyl trimethyl ammonium halide, long-chain alkylbenzyl dimethyl alkanol ammonium halide or the long-chain alkylbenzyl dimethyl benzyl ammonium halide types are preferred. This latter group of compounds, as illustrated by dodecylbenzyl trimethyl ammonium chloride, dodecylmethylbenzyl trimethyl ammonium chloride, dodecylbenzyl dimethyl 2-hydroxyethyl ammonium chloride and dodecylbenzyl dimethyl ammonium chloride, is especially satisfactory in the formation of iodine-quaternary addition products which are a preferred embodiment of the invention.

The halogens and quaternary ammonium germicides combine readily on mixing. Various proportions of halogen and quaternary may be employed, although it is usually desirable to avoid excess halogen since the presence of free, unbound halogen in the final product may lead to some of the undesirable effects previously associated with the pure halogens alone. The exact amount of halogen that will combine with a particular quaternary ammonium germicide is easily determined by titrating an aliquot portion of quaternary with a halogen solution of known concentration. As soon as the quaternary has taken up all of the halogen it can, excess unbound halogen is readily detectable by its characteristic, irritating odor or the formation of halogen amines in ammonia vapor. From this titration the proper proportions of halogen are readily calculated for any amounts of quaternary ammonium germicide. From about 0.01 to about 1.0 moles of halogen per mole of quaternary ammonium germicide or, more desirably, from about 0.1 to about 0.7 mole of halogen per mole of quaternary are suitable proportions, particularly so when iodine and long-chain alkylbenzyl trimethyl ammonium halides are the reactants.

To facilitate handling of the reactants, it is desirable to prepare the halogen and quaternary ammonium addition products in an inert diluent medium sufficient to maintain the materials in substantial solution. Organic solvents such as benzene, xylene, petroleum naphtha, etc., may be used. However, for present purposes, it is preferred to use water as the diluting medium. An aqueous solution containing approximately 50 per cent by weight of the quaternary ammonium germicide has been found quite suitable for mixing with the halogen.

The reaction of the halogens and the quaternary ammonium germicides may be conveniently carried out at ordinary room temperatures of about 70° F. However, in order to maintain the reactants in solution and thus ensure their complete utilization, it is desirable to warm the reaction mixture slightly, usually to from about 100° F. to about 150° F.

The final addition products may be prepared either solvent-free or in liquid solutions. To obtain the dry materials, it is only necessary to evaporate the solvent or diluting medium. This may be done either by merely heating the reaction mixture to the evaporation point of the solvent or special drum-drying and spray-drying apparatus may be employed.

The following examples are illustrative of the preparation of quaternary ammonium germicide-halogen addition products in accordance with the invention.

EXAMPLE 1

Approximately 2½ grams of a 50 per cent aqueous solution of dodecyl benzyl trimethyl quaternary ammonium chloride were diluted to approximately 250 ml. with water. Small increments of a 0.1 normal potassium tri-iodide solution were added to aliquot portions of the quarternary ammonium germicide solution at room temperature while testing externally for a positive starch test. It was found that approximately 21½ ml. of the aqueous dodecyl benzyl trimethyl quaternary ammonium chloride would take up about 3½ ml. of the potassium tri-iodide solution before giving a positive external starch test indicating free unbound iodine. The product thus prepared contained physically bound iodine in elemental form and would not stain surfaces with which it came in contact.

EXAMPLE 2

24.2 grams of a 50 per cent aqueous solution of dodecyl benzyl trimethyl quaternary ammonium chloride were mixed with 6.21 grams of crystalline iodine which dissolved after heating for about one minute on a steam plate while stirring with a glass rod. The normal pungent odor of iodine was completely lacking over the product.

EXAMPLE 3

A dodecyl benzyl trimethyl quaternary ammonium chloride-bromine addition product in aqueous solution was prepared as follows: 95.969 grams of a 50 per cent aqueous solution of dodecyl benzyl trimethyl quaternary ammonium chloride were mixed with 1.661 grams of bromine by stirring at room temperature. The product held the bromine in physically bound form and did not have the ordinarily corrosive characteristics of bromine.

EXAMPLE 4

53.1 grams of dodecyl benzyl trimethyl quaternary ammonium chloride in 50 per cent aqueous solution were mixed with 5.084 grams of iodine bromide by stirring at room temperature. The product thus obtained did not display the undesirable irritating, staining or corrosive nature normally associated with these elements in free form.

EXAMPLE 5

70.723 grams of an aqueous dodecyl benzyl trimethyl quaternary ammonium chloride-iodine addition product containing about 45 per cent by weight of quaternary and 5 per cent iodine were mixed with about 10 ml. of ethyl alcohol. Gaseous chlorine was then bubbled into the mixture through a fritted glass bulb. A progressively lighter colored solution was obtained as the chlorine was added. The final product was a bright yellow viscous material having none of the undesirable characteristics of iodine or chlorine.

EXAMPLE 6

300 grams of an approximately 50 per cent by weight aqueous solution of dodecyl benzyl trimethyl quaternary ammonium chloride was added to a 1500 ml. stirred flask. Stirring was started and 50 grams of iodine was added. The mixture was then heated to a temperature of from about 110 to about 130° F. As soon as the iodine had dissolved, heating was discontinued and an additional 600 grams of 50 per cent aqueous solution of dodecyl benzyl trimethyl quaternary ammonium chloride was added to the flask. Stirring was thereafter continued for about 10 minutes to insure uniformity. The quarternary-iodine addition product contained 10 per cent by weight iodine in physically bound form and possessed germicidal activity to a high degree.

The addition products of the above examples all react with sodium thiosulfate as do the elemental halogens and all give negative results when tested for free halogen with starch or with starch-iodide solutions.

The following table sets forth a summary of various illustrative quaternary ammonium germicide-iodine products which were prepared according to the procedures of the foregoing examples.

*Table I*

IMMOBILIZATION OF IODINE AS TESTED WITH STARCH AS AN EXTERNAL INDICATOR

| Compound | Iodine Take-up Before Yielding Starch Test | |
|---|---|---|
|  | Gms. $I_2$ per gm. Compound | Moles $I_2$ per mole compound |
| Dodecyl benzyl trimethyl ammonium chloride | 0.40–0.47 | 0.6–0.7 |
| Dodecyl benzyl dimethyl benzyl ammonium chloride | 0.393 | 0.65 |
| Cetyl pyridinium bromide (crystalline) | 0.09 | 0.14 |
| di-(dodecyl benzyl)-dimethyl ammonium chloride | 0.24–0.25 | 0.58–0.61 |
| di-n-octylbenzyl-di-methyl ammonium chloride | 0.27 | 0.52 |
| Dodecylphenyl trimethylammonium methosulfate | 0.29 | 0.49 |
| Tribenzyl methylammonium methosulfate | 0.25 | 0.40 |
| Dodecylbenzyltriethanolammonium chloride | 0.044–0.048 | 0.079–0.084 |
| p-tertiary octyl phenoxy ethoxy ethyl dimethyl benzyl ammonium chloride | 0.32–0.38 | 0.58–0.68 |
| Octadecyl dimethyl benzyl ammonium bromide | 0.42 | 0.59 |
| Tetramethyl ammonium chloride | Nil | Nil |
| Trimethyl phenyl ammonium chloride | Nil | Nil |
| Nitrobenzyltrimethyl ammonium chloride | Nil | Nil |
| n-octylbenzyl thiuronium chloride | Nil | Nil |

From the above table it may be seen that it is the quaternary ammonium germicides of high molecular weight which are preferred for taking up the halogen. Although dodecyl benzyl trimethyl ammonium chloride took up a substantial amount of iodine, trimethyl phenyl ammonium chloride took up none.

To illustrate the germicidal effectiveness of the quaternary ammonium germicide-halogen addition products of this invention, various compositions were tested against samples of water artificially inoculated with Aerobacter aerogenes, Escherichia coli, Staphylococcus aureus and Bacillus mycoides, all common bacteria against which germicidal agents are used. Tests were carried out at various concentrations of germicidal agent as indicated in the following table and bacterial growth or decrease was observed at different time intervals. In each case the concentration represents parts per million of total active components, i. e., quaternary ammonium plus halogen.

cidal activity characteristic of the quaternary ammonium germicide-halogen addition products of this invention, it is obvious that they may be effectively utilized at low concentrations where ordinary germicides would be economically impractical. This factor, in addition to their non-corrosive, non-irritating and non-staining nature renders them useful in many applications, a few of which include: As therapeutic agents for human infection, as germicides for household and industrial applications, as disinfectants for water, as active ingredient in germicidal compositions such as salves, lotions, etc., as well as many other uses.

We claim:

1. A germicidal composition consisting essentially of a long-chain alkyl benzyl trimethyl ammonium halide and from 0.01 to 0.7 mole of elemental iodine per mole of quaternary ammonium salt, the composition being characterized in that it reacts with an amount of thiosulfate substantially equivalent to its iodine component and in

*Table II*

BACTERIOCIDAL ACTIVITY OF GERMICIDES AT USE CONCENTRATIONS

| Compound | Concentration | 5 Minutes | | 10 Minutes | | 20 Minutes | | 30 Minutes | | 60 Minutes | |
|---|---|---|---|---|---|---|---|---|---|---|---|
| Control | No Compound | 96,000 | | 98,000 | | 103,000 | | 97,000 | | 98,000 | |
| 80 to 20 Wt. Ratio Quaternary-Iodine. | 1 p. p. m. | 37,000 | (38.6%) | 68 | (0.06%) | 0 | (0) | 0 | (0) | 0 | (0) |
| Do | 2 p. p. m. | 1,800 | (1.8%) | 32 | (0.03%) | 0 | (0) | 0 | (0) | 0 | (0) |
| Do | 4 p. p. m. | 330 | (0.3%) | 0 | (0) | 0 | (0) | 0 | (0) | 0 | (0) |
| Do | 8 p. p. m. | 0 | (0) | 0 | (0) | 0 | (0) | 0 | (0) | 0 | (0) |
| 90 to 10 Wt. Ratio Quaternary-Iodine. | 1 p. p. m. | 30,000 | (31.2%) | 4,100 | (4.2%) | 2,100 | (2.0%) | 2,300 | (2.4%) | 1,600 | (1.6%) |
| Do | 2 p. p. m. | 17,000 | (17.7%) | 640 | (0.6%) | 380 | (0.3%) | 230 | (0.2%) | 0 | (0) |
| Do | 4 p. p. m. | 135 | (0.1%) | 23 | (0.02%) | 9 | (0) | 0 | (0) | 0 | (0) |
| Do | 8 p. p. m. | 0 | (0) | 0 | (0) | 0 | (0) | 0 | (0) | 0 | (0) |
| 95 to 5 Wt. Ratio Quaternary-Iodine. | 1 p. p. m. | 58,000 | (60.4%) | 36,000 | (36.7%) | 37,800 | (36.7%) | 30,000 | (30.9%) | 14,100 | (14.4%) |
| Do | 2 p. p. m. | 29,000 | (30.2%) | 8,400 | (8.5%) | 6,800 | (6.6%) | 5,400 | (5.5%) | 4,800 | (4.9%) |
| Do | 4 p. p. m. | 18,000 | (18.8%) | 480 | (0.4%) | 420 | (0.4%) | 590 | (0.5%) | 0 | (0) |
| Do | 8 p. p. m. | 7,000 | (8.0%) | 740 | (0.7%) | 510 | (0.5%) | 600 | (0.6%) | 0 | (0) |
| 97.5 to 2.5 Wt. Ratio Quaternary-Iodine. | 1 p. p. m. | 68,000 | (70.9%) | 55,000 | (55.1%) | 50,000 | (48.6%) | 31,200 | (32.2%) | 27,200 | (27.7%) |
| Do | 2 p. p. m. | 61,000 | (63.5%) | 49,000 | (50.0%) | 38,000 | (35.9%) | 24,000 | (24.7%) | 23,100 | (23.6%) |
| Do | 4 p. p. m. | 28,000 | (29.2%) | 16,000 | (16.3%) | 9,900 | (9.6%) | 11,400 | (11.8%) | 9,600 | (9.8%) |
| Do | 8 p. p. m. | 14,000 | (14.6%) | 1,600 | (1.6%) | 1,820 | (1.7%) | 700 | (0.7%) | 500 | (0.5%) |
| 99 to 1 Wt. Ratio Quaternary-Iodine. | 1 p. p. m. | 95,600 | (99.6%) | 94,000 | (95.8%) | 103,000 | (100.0%) | 79,800 | (82.2%) | 88,200 | (90.0%) |
| Do | 2 p. p. m. | 99,600 | (100.0%) | 97,200 | (99.3%) | 95,800 | (93.1%) | 75,000 | (77.3%) | 60,200 | (61.4%) |
| Do | 4 p. p. m. | 98,400 | (100.0%) | 39,000 | (100.0%) | 90,100 | (87.6%) | 65,800 | (67.8%) | 58,900 | (60.1%) |
| Do | 8 p. p. m. | 86,200 | (89.8%) | 82,500 | (83.9%) | 86,700 | (84.2%) | 64,600 | (66.7%) | 52,400 | (53.4%) |
| Dodecylbenzyl trimethyl ammonium chloride. | 1 p. p. m. | 91,800 | (95.6%) | 98,100 | (100.0%) | 81,700 | (79.3%) | 67,000 | (69.0%) | 76,700 | (78.3%) |
| Do | 2 p. p. m. | 94,700 | (98.7%) | 98,700 | (100.0%) | 87,600 | (85.1%) | 73,300 | (75.5%) | 74,500 | (76.0%) |
| Do | 4 p. p. m. | 90,100 | (93.9%) | 89,500 | (91.3%) | 80,100 | (77.8%) | 69,900 | (72.1%) | 69,200 | (70.7%) |
| Do | 8 p. p. m. | 88,000 | (91.9%) | 78,100 | (78.6%) | 70,000 | (68.0%) | 55,200 | (56.8%) | 54,600 | (55.7%) |
| Aqueous solution of Iodine | 1 p. p. m. | 95,000 | (99.2%) | 89,000 | (90.0%) | 111,000 | (100.0%) | 97,000 | (100.0%) | 88,000 | (89.8%) |
| Do | 2 p. p. m. | 98,000 | (100.0%) | 92,000 | (93.7%) | 98,000 | (95.2%) | 93,000 | (95.4%) | 92,000 | (93.7%) |
| Do | 4 p. p. m. | 92,000 | (96.9%) | 90,000 | (91.8%) | 101,000 | (98.1%) | 96,000 | (99.0%) | 98,000 | (100.0%) |
| Do | 8 p. p. m. | 98,000 | (100.0%) | 96,000 | (98.0%) | 93,000 | (90.3%) | 98,000 | (100.0%) | 97,000 | (98.9%) |

The "Quaternary" in the above table was the preferred dodecyl benzyl trimethyl quaternary ammonium chloride mentioned previously. It was taken as a representative quaternary for the purposes of the above tests. In the table the main figures represent the number of bacteria surviving at the end of the test period noted, while the parenthetic figures represent the per cent survival for convenient reference.

From the table of results given above, it is readily apparent that the quaternary ammonium germicide-halogen products are far more effective germicides than either the quaternary or halogen alone in similar concentrations. For example, with an 80 to 20 weight ratio quaternary-iodine addition product, less than 20 minutes were required to kill the entire germ colony, whereas only a relatively small decrease was noted in the same size colony at the end of an hour when either the quaternary or iodine was employed alone.

In view of the above demonstrated high germithat its response to the starch test for iodine is negative.

2. A germicidal composition consisting essentially of a quaternary ammonium salt of the group consisting of long-chain alkyl benzyl trimethyl ammonium halides, long-chain alkyl benzyl dimethyl benzyl ammonium halides, long-chain alkyl benzyl dimethyl ethanol ammonium halides, long-chain alkyl pyridinium halides, bis long-chain alkyl benzyl dimethyl ammonium halides, long-chain alkyl phenyl trimethyl ammonium methosulfates, tribenzyl methyl ammonium methosulfate, long-chain alkyl benzyl triethanol ammonium halides, p-tertiary-octylphenoxyethoxyethyl dimethyl benzyl ammonium halides and long-chain alkyl dimethyl benzyl ammonium halides and from 0.1 to 0.7 mole of elemental halogen per mole of quaternary ammonium salt, the composition being characterized in that it reacts with an amount of thiosulfate substantially equivalent to its halogen component and in that its response to the starch test for free halogen is negative.

3. A germicidal composition consisting essentially of a long-chain alkyl benzyl trimethyl ammonium halide and from 0.01 to 0.7 mole of elemental halogen per mole of quaternary ammonium salt, composition being characterized in that it reacts with an amount of thiosulfate substantially equivalent to its halogen component and in that its response to the starch test for free halogen is negative.

4. A germicidal composition consisting essentially of dodecyl benzyl trimethyl quaternary ammonium chloride and from 0.01 to 0.7 mole of elemental iodine per mole of quaternary ammonium salt, the composition being characterized in that it reacts with an amount of thiosulfate substantially equivalent to its iodine component and in that its response to the starch test for iodine is negative.

5. A germicidal composition consisting essentially of dodecyl benzyl trimethyl quaternary ammonium chloride and about 10 per cent, by weight, of iodine based on the quaternary ammonium salt, the composition being characterized in that it reacts with an amount of thiosulfate substantially equivalent to its iodine component and in that its response to the starch test for iodine is negative.

References Cited in the file of this patent

UNITED STATES PATENTS

| Number | Name | Date |
|---|---|---|
| 2,498,174 | Morris | Feb. 21, 1950 |

OTHER REFERENCES

Chattaway et al., "J. Chem. Soc." (London), vol. 123 (1923), pp. 654–662.

McCombie et al., "J. Chem. Soc." (London), vol. 123 (1923), pp. 141–153.

Reade, "J. Chem. Soc." (London), 1926, pp. 2528–31.

Jones et al., "J. Am. Chem. Soc.," vol. 46 (1924), pp. 1840–55.

Ray et al., "J. Indian Chem. Soc.," vol. 13 (1936), pp. 456–63.